United States Patent [19]

Kaneko

[11] Patent Number: 4,650,161

[45] Date of Patent: Mar. 17, 1987

[54] SPINNING REEL HAVING ELECTRONIC LINE TENSION DISPLAY MEANS

[75] Inventor: Kyoichi Kaneko, Tokyo, Japan

[73] Assignee: Daiwa Seiko Inc., Tokyo, Japan

[21] Appl. No.: 801,046

[22] Filed: Nov. 22, 1985

[30] Foreign Application Priority Data

Nov. 30, 1984 [JP] Japan .................. 59-253168
Nov. 30, 1984 [JP] Japan .................. 59-253169
Feb. 18, 1985 [JP] Japan .................. 60-30079

[51] Int. Cl.⁴ .................. H01K 89/02; F16D 66/00; G01L 5/10
[52] U.S. Cl. .................. 242/84.5 A; 73/862.39; 188/1.11; 188/83; 242/84.21 R
[58] Field of Search .................. 242/84.1 R, 84.1 A, 242/84.1 M, 84.5 A, 84.5 P, 84.51 A, 84.2 R, 84.3, 84.21 R; 73/862.08, 862.19, 862.39; 188/1.11, 83

[56] References Cited

U.S. PATENT DOCUMENTS

| | | | |
|---|---|---|---|
| 2,061,863 | 11/1936 | Wells | 73/862.39 |
| 3,246,859 | 4/1966 | Martin | 242/217 X |
| 3,255,981 | 6/1966 | Wood | 242/84.5 P |
| 3,273,385 | 9/1966 | Donnelly et al. | 73/862.08 X |
| 3,911,387 | 10/1975 | Seabury | 73/862.08 X |
| 3,946,963 | 3/1976 | Oberg | 242/84.51 A X |
| 3,999,426 | 12/1976 | Sonderegger | 73/862.08 |
| 4,391,419 | 7/1983 | Iwama et al. | 242/84.5 P |

FOREIGN PATENT DOCUMENTS

| | | | |
|---|---|---|---|
| 52-876 | 1/1977 | Japan . | |
| 57-15847 | 4/1982 | Japan | 242/84.1 R |
| 57-40788 | 9/1982 | Japan | 242/84.1 R |

OTHER PUBLICATIONS

"Anglers Use High Tech for Fishing" by C. Boyd Pfeiffer in *The Washington Times Magazine* p. 3M 10-1-5-1984.

Primary Examiner—Stuart S. Levy
Assistant Examiner—Joseph J. Hail, III
Attorney, Agent, or Firm—Kalish & Gilster

[57] ABSTRACT

A spinning reel is provided with a line tension display unit including a display which may be either of analog or digital form. The reel includes a spool shaft for mounting of the spool, the reel body being provided with the line tension/display unit which includes a member swingable about the spool shaft and operatively connected to the spool shaft for swinging movement in response to tension in the line. A torsion spring resists such swinging movement. The swingable member causes the display to indicate the tension value. In analog form, the swingable member provides a pointer for showing line tension on a scale. In digital form, the display includes LED's or LCD's for display of discrete tension values. In one digital version, a microprocessor is used to drive the line tension display and to provide also time-of-day, stopwatch, alarm and line-breakage-warning functions.

19 Claims, 26 Drawing Figures

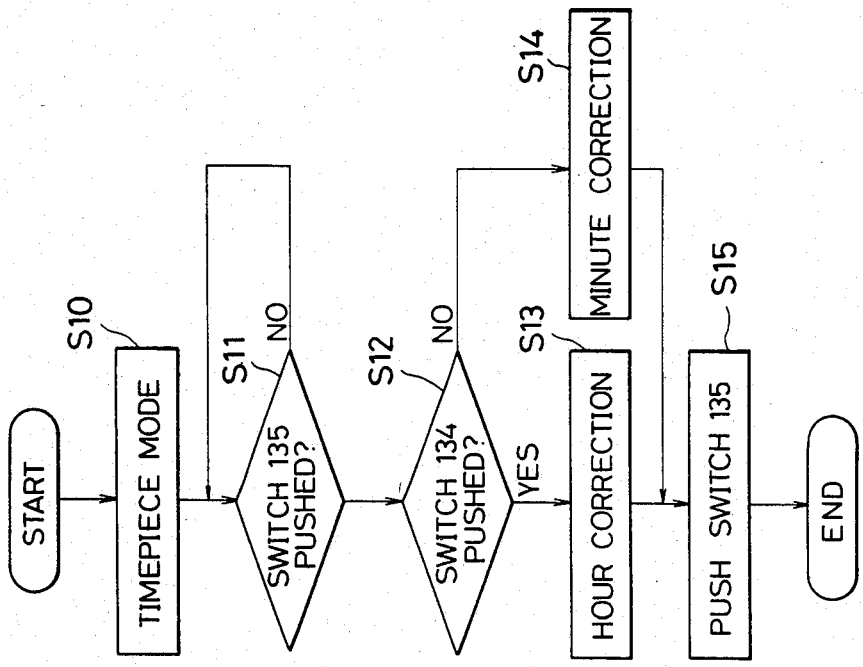
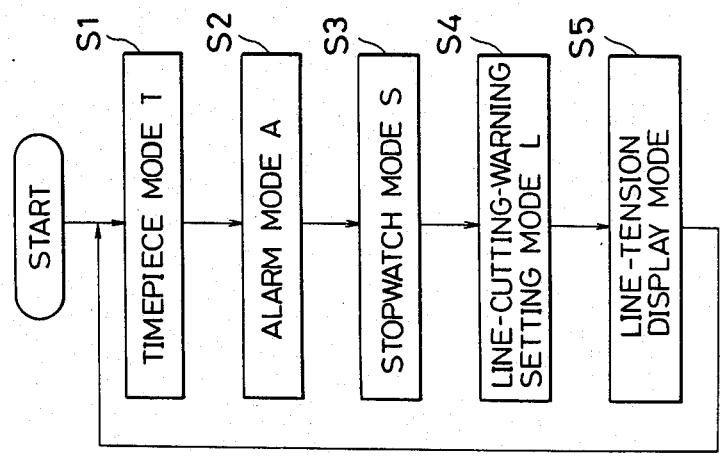

SPINNING REEL HAVING ELECTRONIC LINE TENSION DISPLAY MEANS

BACKGROUND AND SUMMARY OF THE INVENTION

The present invention relates to a fishing line tension display device of a spinning reel, and intends specifically to permit direct visual perception of the tensile force of a fishing line at the time of fighting a caught fish.

A spinning reel is generally composed of a spool, a pick-up bail mechanism which is rotated when a handle is turned to wind the fishing line on the spool and also rotated in response to paying out of the fishing line, and a drag unit which is frictionally coupled to a supporting shaft of the spool and adjusts the degree of force at which the fishing line is payed out when pulled.

The drag unit prevents cutting or breaking of the fishing line by paying out the fishing line automatically when a large tensile force is applied to the fishing line due to strong pulling or abrupt movement or tugging of a caught fish when fighting etc., and its drag force determining the strength of drawing at which the fishing line is allowed to be payed out can be adjusted by turning a control knob in either of fastening or loosening direction depending upon the thickness of the fishing line used or an expected degree of pulling strength of object fish.

A spinning reel of the foregoing sort is disclosed in Japanese Patent Publication No. 52-876, for example.

A conventional spinning reel as above, however, has no means for detecting and displaying the tensile force of the fishing line when fighting a caught fish; accordingly, it is impossible to judge what degree of tension is actually acting on the fishing line, and it is also impossible to judge the line tensile force only from a scale for the drag control knob which indicates drag force Because the drag force relating to the thickness of the fishing line and object fish is typically set on the basis of an angler's experience, it is impossible to confirm whether or not the drag force set by adjustment of the control knob is set within the permitted limit of tension of the fishing line; thus, the drag force is often set too large or too small.

Although a conventional drag unit as above has a drag force scale associated with the control knob, this scale indicates only nominal drag force; thus, from reading it, the angler cannot judge the degree of tension actually exerted on the fishing line. Accordingly, the drag force is often set too large or too small.

If the drag force is set too large, and in excess of the tensile strength of the fishing line, frequent line breakage is caused when fighting a fish. If the drag force is set too small, the fishing line is unnecessarily payed out and fighting is hindered, consequently hindering landing the fish.

In fishing, it may be necessary to observe the circumstances of tide, time intervals for giving ground bait, time intervals appropriate for moving tackle up and down and of exchanging bait, time intervals of fish bites, and the depth of ledges, etc. These conditions conducive to catching fish are generally judged on the basis of angler's experience and by use of a digital electronic wrist watch, such as of the type recently marketed having alarm and stopwatch functions as well as an ordinary time display function. However, because the above type electronic wrist watch is designed for suitability of real life requirements for display of time and alarm setting; a watch of this type is of doubtful utility for fishing from the viewpoint of operability and visual perceptibility when fighting a fish, and thus can rarely be used effectively when fishing.

The present invention has been devised to solve the problems of the prior art as above; thus, it has as an object the provision of a spinning reel having a fishing line tension display device which permits direct visual perception of the tensile force acting on a fishing line at the time of fighting a fish; and which allows easy setting of drag force within the permitted limit of tension of fishing line used in the reel.

It is another object of the present invention to provide a fishing reel having a multi-function display which presents display of the tensile force of a fishing line and warning of line breakage; which provides good operability and visual perceptibility in relation to indication and notification suitable for judgment of respective conditions yielding successful fishing; which display is directly incorporated within the reel to provide a more effective visual perceptibility and operability than has heretofore been known; and which display also provides a time-of-day, stopwatch, and alarm time modes of operation.

It is also an object of the invention to provide a fishing reel including such a multi-function display of digital type and which includes a central processing unit (CPU) with a ROM-structured program memory for storage of data and programs, as well sa RAM-structured memory, and by means of which CPU the display is controlled.

Other objects of the invention will be in part apparent and in part pointed out hereinbelow.

BRIEF DESCRIPTION OF THE DRAWINGS

FIG. 21 is a flowchart for explanation of mode change process; and

FIGS. 22-26 are flowcharts for explanation of the operation of the multi-function display device according to the present invention.

DESCRIPTION OF THE PREFERRED EMBODIMENTS

Figure 1:
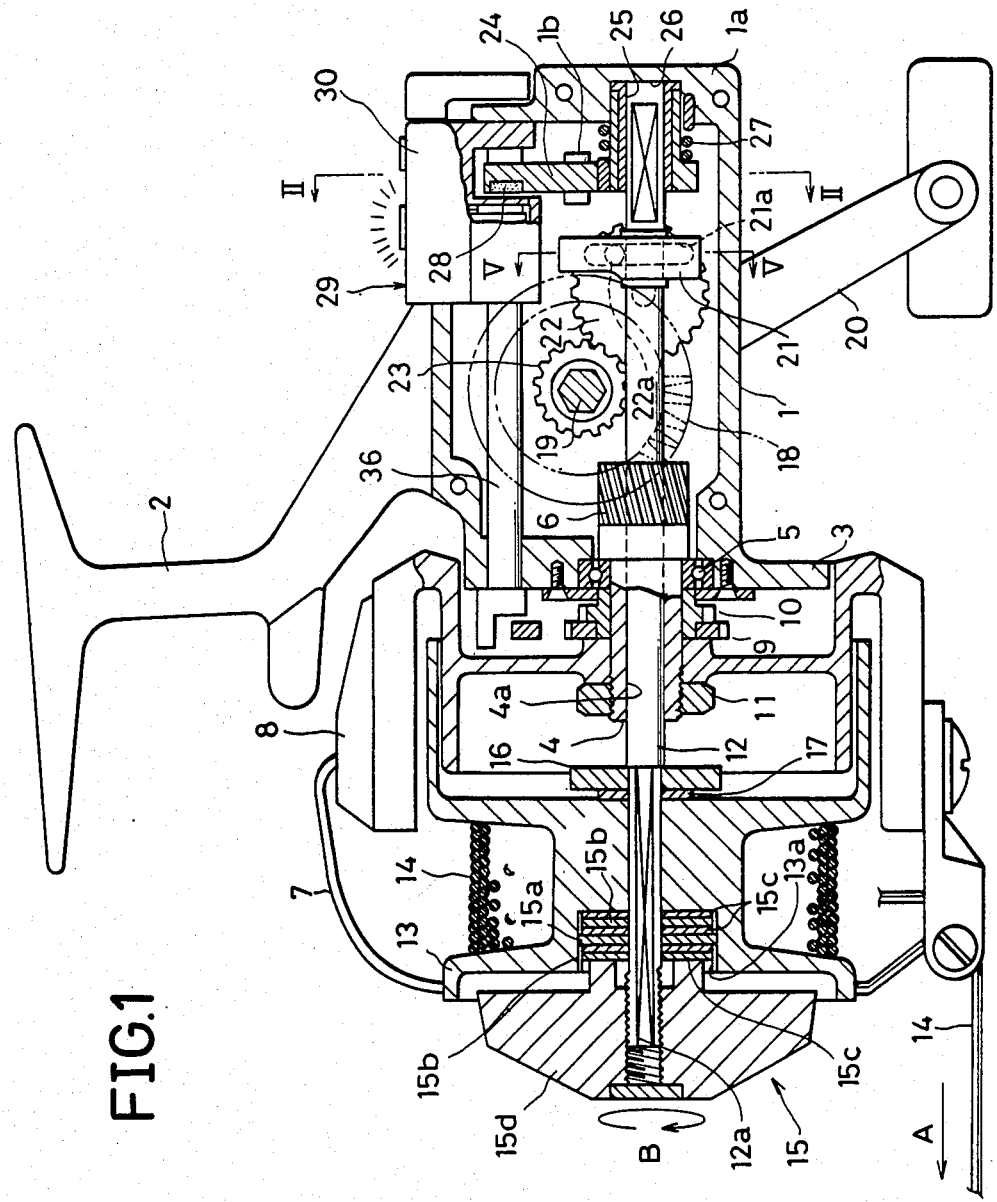
FIG. 1 is a longitudinal sectional side view of a spinning reel equipped with a line tension display device according to the present invention.

Referring to FIGS. 1-6, there is shown an embodiment of a spinning reel of the front drag type equipped with a fishing line tension display device according to the present invention. Reference numeral 1 indicates a reel body equipped with a mounting leg 2 for a spinning rod. Through a front wall 3 of reel body 1 a hollow flyer shaft 4 passes at a right angle. Flyer shaft 4 is supported rotatably by a bearing 5 on the front wall 5, the projecting end of flyer shaft 4 inside reel body 1 having a pinion 6 provided integrally thereon. The projecting portion of flyer shaft 4 outside the reel body 1 has a flyer 8 secured integrally and concentrically thereto which has a bail 7. On flyer shaft 4 between the boss portion of flyer 8 and bearing 5 there are secured integrally a ratchet gear 9 for prevention of reversal of flyer 8 and a ratchet wheel 10 for generation of clicks. Reference numeral 11 indicates a nut for fastening and fixing integrally together flyer 8, ratchet gear 9, and click-generating ratchet wheel 10 on flyer shaft 4.

Reference numeral 12 indicates a spool shaft passing through a shaft hole 4a of hollow flyer shaft 4 and supported slidably in the axial direction of the flyer shaft and rotatably thereby. To the front projecting portion of spool shaft 12 a spool 13 is attached rotatably. Reference numeral 14 indicates fishing line wound on spool 13 and at 15 is indicated a drag unit which adjusts the degree of pulling force at which when pulled the fishing line is payed out. Drag unit 15 includes a first washer 15a located within a cylindrical cavity 13a formed on the front side of spool 13 concentrically with respect to spool shaft 12. Washer 15a is coupled to spool 13 so as not to rotate relatively thereto. Coupled to spool shaft 12 are a plurality of second washers 15b so as not to rotate relatively thereto. A plurality of friction washers 15c are interposed individually between first and second washers 15a, 15b and between the second washers and the bottom surface of cavity 13a. A knob 15d is screwed on a threaded portion 12a formed on the point portion of spool shaft 12 for adjusting the force at which fishing line 14 can be drawn out, i.e., the drag force, by tightening washers 15a, 15b and friction washers 15c. A spool seat member 16 is secured to a portion of spool shaft 12 close to the inner end surface of spool 13. Between spool seat member 16 and the inner end surface of spool 13 a friction member 17 is interposed for creating frictional coupling between spool seat member 16 and spool 13 when tightened by knob 15a.

A drive gear 18 is arranged inside reel body 1, in mesh with pinion 6, being attached to a drive shaft 19 extending in the direction orthogonal to spool shaft 12 and supported rotatably by reel body 1. To the projecting end of drive shaft 19 outside reel body 1 an operation handle 20 is attached for winding the line.

Reference numeral 21 indicates an oscillation drive follower element, i.e., yoke, which is journalled to the projecting portion of spool shaft 12 inside reel body 1, but is restricted in movement in the axial direction. Element 21 has a guide groove 21a extending vertically for receiving a pin 22a provided on an oscillation drive gear 22 for oscillating engagement of element 21. Gear 22 is supported rotatably inside reel body 1 and in mesh with a gear 23 integrally attached to drive shaft 19. Therefore, as handle 20 is operated, being turned in the direction of winding the line, flyer 8 rotates. At the same time, oscillation gear 22 is driven by gear 23, with the result that the crank action of pin 22a upon element 21 causes spool shaft 12, together with spool 13, to be oscillated with reciprocal stroking in an axial direction together, so that fishing line 14 is wound on spool 13 evenly.

Reference numeral 24 indicates a line tension display pointer member which is swingably mounted upon spool shaft 12 within reel body 1 via a sleeve 25 fitted guidably on such shaft end portion. One end of sleeve 25 is fitted within a cavity 26 formed in a rear wall 1a of reel body with sleeve 25 being prevented from rotating or axial movement. Display member 24 and rear wall 1a are interconnected by a torsion spring 27 interposed therebetween concentrically with respect to sleeve 25. Thus, the whole, inclusive of the member 24, spool shaft 12 and spool 13, is urged in the direction of an arrow C shown in FIG. 2; and turning of spool 13 in the direction of paying out line is restricted. In addition, member 24 is held captive by a supporting member (i.e., stop) 1b projecting inwardly from a side wall of reel body 1 so that member 24 cannot shift in the axial direction of spool shaft 2. In a side surface proximate the outer end or point of display member 24, a magnet 28 is embedded.

Reference numeral 29 indicates a line tension display unit positioned above pointer member 24 and mounted to reel body 1. Within a housing 30 of display unit 29, there are a plurality of switching elements 31a-31e (FIG. 2), such as five reed switches, which are positioned at a given angular spacing opposite to magnet 28 and aligned in the swinging direction of pointer member 24. On an upper panel or surface of housing 30, there are arranged display elements 32a-32e (FIG. 4), such as light emitting diodes or liquid crystal displays, and correspondong in number to the number of switching elements 31a-31e. Proximate each display element 32a-32e, indicia 33 are provided for indicating line tension values. Reference numeral 34 indicates a power switch.

Figure 6:
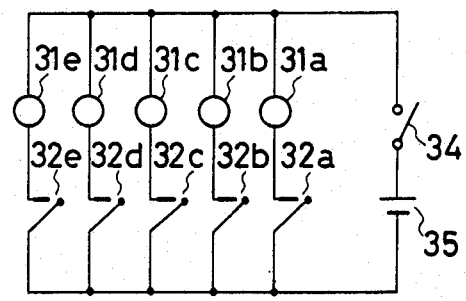
FIG. 6 is a circuit diagram of the display unit shown in FIG. 1.

FIG. 6 is a circuit diagram shows series circuit interconnecting of respective switching elements 31a-31e and display elements 32a-32e, with each such series circuit being connected in parallel with others through power switch 34 to a battery power source 35.

In FIG. 1, reference numeral 36 indicates a check lever provided on the reel body 1 for blocking reversal of the flyer and releasing the same.

Operation of the just-described device configured according to the present invention will not be set forth.

In fishing, first, knob 15a of drag unit 15 is operated and set to a desired drag setting depending upon the thickness of the fishing line used and the intended or object, fish which is sought to be caught. Then, power switch 34 of the display unit 29 is switched on to set display unit 29 in the tension display-enable state. In this state, when a fish takes tackle casted to a point resulting in fishing line 14 receiving the torsional force of the direction of the arrow A shown in FIG. 1, rotation of flyer 8 in the direction of paying out line is restricted by ratchet gear 9. Moreover, rotation of spool 13 in the direction of paying out line is restricted by the drag force of drag unit 15 and torsion spring 27, so that torque is generated on spool 13, which tends to be rotated in the direction of arrow B shown in FIG. 1. In response to this torque, torsion spring 27 deforms torsionally. Depending upon the resultant extent of torsional deformation, pointer member 24 together with the spool shaft 12 is caused to swing in the direction of arrow D shown in FIG. 2, with magnet 28 at the swinging point coming to a position either opposite to one of the switching elements 31a-31e or a location between adjacent ones of the switching elements. As a result, the switching element opposite to magnet 28 (for example, switching element 31c) is switched on so that corresponding display element 32c is turned on. Accordingly, through reading of the tension value provided proximate display element 32c, the tensile force acting on fishing line 14 at that time can be perceived.

While the angler operates and turns handle 20 in the direction of winding the line in compliance with movement of fish caught on the tackle, if the tensile force acting on the line is not so strong as to result in a drag slipping state, the rotation of handle 20 is transmitted through drive gear 18, pinion 6 and flyer shaft 4 to flyer 8. As a result, flyer 8 and bail 7 rotate thereby to wind the line on spool 13. At the same time, the rotation of drive shaft 19 caused by handle operation is transmitted through gear 23 to oscillation drive gear 22. Responsive to rotation of gear 22, spool 13 is axially reciprocated together with spool shaft 12 by follower element 21, with the fishing line being thereby wound on spool 13 evenly.

On the other hand, if the line is drawn strongly due to abrupt pulling, turning or other movement of the fish, which fighting, and its tensile force becomes larger than the drag force to cause drag slippage, the spool 13 turns in the direction of paying out line, thereby preventing breaking of the line. The line tensile force at this moment causes movement of pointer element 24 to switch on the switching element turns on to indicate the line tension.

Accordingly, through observation of the display state of display unit 29, the pulling of the caught fish can be perceived, making it as possible to judge directly through visual display as to whether or not the drag force set in the drag unit is suited to the fishing ilne being used. Further, on the basis of the state of lighting of display elements 32a-32e, it is possible to set the drag force to a level suited to the thickness of the fishing line and object fish so that setting the drag within the permitted limit of tension of the fishing line becomes easy. Although in the embodiment shown, the display is selected so as to give five gradations, in appropriate units (kg. or lb.), if the magnitude of tension is represented by the number of line size, such as No. 1, No. 2, ... No. 5, etc., the permitted limit of use of the fishing line can be perceived visually, and this mode of display can be utilized simply to provide warning of line breakage.

Figure 2:
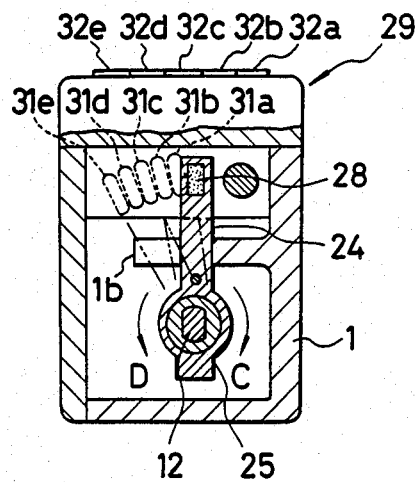
FIG. 2 is a sectional view taken along line II—II of FIG. 1.
Figure 3:
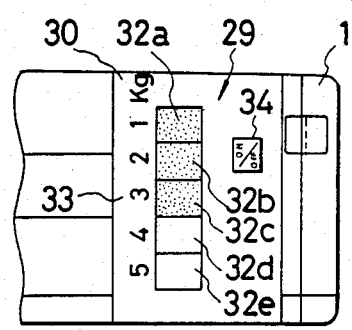
FIG. 3 is a plan view of a display unit section of the spinning reel.
Figure 4:
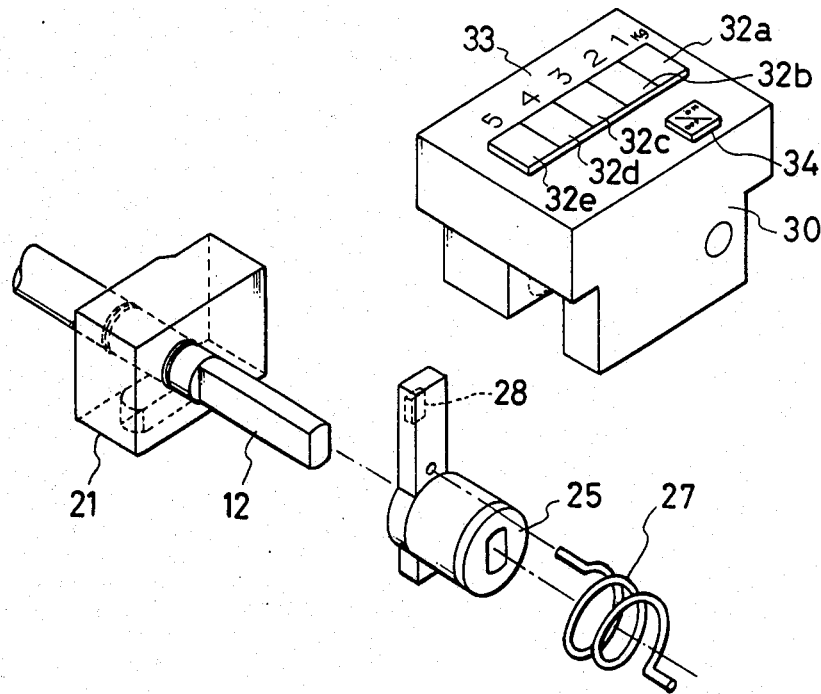
FIG. 4 is an exploded perspective view of the display unit and working member section shown in FIG. 1.
Figure 5:
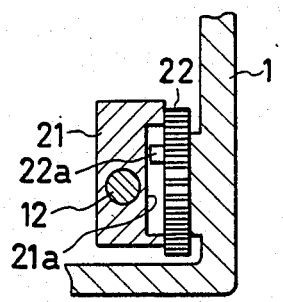
FIG. 5 is a sectional view taken along line V—V of FIG. 1.
Figure 7:
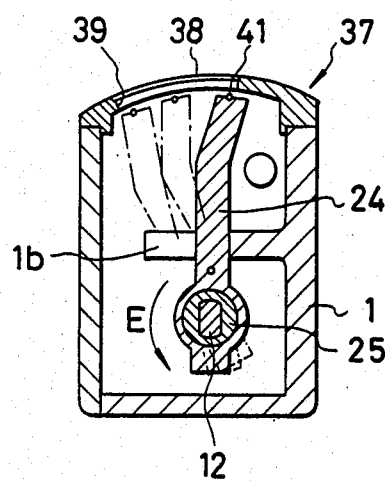
FIG. 7 is a sectional view similar to that of FIG. 2 which shows a second embodiment of the present invention device.
Figure 8:
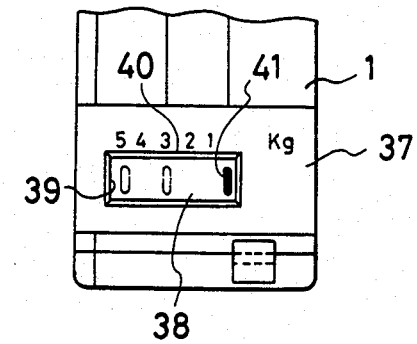
FIG. 8 is a plan view of the display unit section of such second embodiment.

In FIGS. 7 and 8, description is omitted of elements identical to those of FIGS. 2 and 3 but bear the same reference numerals as before, while elements differing from those previously described will now be described, laying emphasis thereon.

In this embodiment, a display unit 37 is mounted on reel body 1 so as to be opposite to the swinging point of pointer member 24. Display unit 37 has a display window 39 covered by a transparent face 38. Along the peripheral margin of face 39 a tension indicating scale 40 is formed, extending in the swinging direction of member 24; on index mark 41 is also formed on the swinging point surface of member 24.

In this embodiment, as member 24 swings in the direction of arrow E, a graduation of scale 40 indicated by index mark 41 represents the line tensile force. Accordingly, this embodiment does not employ switching elements, display elements, magnet, cell, and so forth, etc., as utilized in the first embodiment, thus provides a first tensile force display which is simplified and low-priced.

As described hereinabove, according to the present invention, member 24 is fitted on the spool shaft so that, except as limited by member 1b, member 24 is slidable in the axial direction of the spool shaft relative thereto, but is prevented from rotating thereabout; the spring member is provided to restrict rotation, in the direction of paying out line, of the whole inclusive of the working member, spool and spool shaft equipped with front drag means; and the arcuate extent of swinging of member 24, as swingable together with the spool shaft due to the torque generated by the tensile force acting on the line when a fish has taken the tackle (i.e., when fishing) is indicated by the display unit. The tensile force acting on the line during fighting can, therefore, directly be perceived visually, and setting of the drag force within the permitted limit of tension of the line used can be performed easily on the basis of the tension display provided by the display unit.

FIGS. 9 through 13 show a third embodiment of the spinning reel of the rear drag type equipped with a fishing line tension display device according to the present invention. In these figures, reference numeral 51 indicates a reel body provided with a mounting leg 52 for the spinning rod, and in the front section of reel body 51 a flyer 55 is mounted rotatably by a hollow flyer shaft 54 having a pinion 53. Reference numeral 56 indicates a bail attached to the flyer 55. A spool shaft 57 passes through the bore of flyer shaft 54 and is supported thereby slidably and rotatably. To the front section of spool shaft 57, a spool 58 is secured integrally, and on which the fishing line 59 is wound.

A drive gear 69 is arranged inside reel body 51 in mesh with pinion 53. Drive gear 60 is attached to a drive shaft 61 supported rotatably by reel body 51 and extending in the direction orthogonal to spool shaft 57. A handle 62 is affixed to the projecting end of drive shaft 61 outside the reel body 51, for control of line winding. Reference numeral 63 indicates a yoke or drive follower secured to tne projecting end portion of spool shaft 57. It includes a guide groove 63a extending vertically for receiving a pin 64a provided on an oscillation drive gear 64 supported rotatably in mesh with a gear 65 secured to drive shaft 61. Accordingly, as handle 62 is operated and turned in the direction of winding the line, flyer 55 rotates and at the same time oscillation drive gear 64 is driven by gear 65. As a result, crank action of pin 64a relative to member 63 causes shaft 57 to reciprocate axially together with spool 58 for winding line 59 evenly on the spool 58.

Reference numeral 66 indicates a rear type drag unit for adjusting the degree of tension of line 59 when payed out. Drag unit 66 includes a cylindrical body 69 having an end wall which is fitted into a cylindrical opening 67 concentric with spool shaft 57, in a rear wall 51a of the reel body. Drag unit body 69 is retained by a snap ring 68. A sleeve 70 passes through and is supported by a bottom wall 69a of body 69. Sleeve 70 is fitted on spool shaft 57 being axially free relative to shaft 57 but being caused to rotate with shaft 57 as by splined connection therewith. Drag unit 66 comprises a group 71 of laminated washers positioned between sleeve 70 and cylindrical body 69 for applying the drag force through spool shaft 57 to sleeve 70. A spring 72 urges laminated washer group 71 into compressed relation to generate the drag force. A knob 73 threaded to the opening section of cylindrical body 69 provides adjustment of the drag force.

Reference numeral 74 indicates a ratchet wheel for click generation affixed the projecting end of sleeve 70 within reel body 51 and engaged by a resilient pawl segment 75 attached to the inside of reel body 51. A torsion spring 76 is arranged concentrically around the periphery of sleeve 70, being positioned between ratchet wheel 74 and body bottom wall 69a. One end of torsion spring 76 is coupled to body 69 and the other end to reel body 51; thus, the whole assembly comprising spool shaft 57 and spool 58 is urged in the direction of arrow C shown in FIG. 10 so that rotation of spool 58 is restricted in the direction of paying out line. An arm 77 extends radially from body 69 and functions to limit rotation of body 69 in the direction of arrow C and is swingable, in the same manner as element 24 of the previous embodiments, in the direction of arrow D. Similarly, there is embedded in the side surface of arm or pointer 77 a magnet 78.

A line tension display unit 79 is positioned above arm 77, being affixed to reel body 51 within a housing 80 of display unit 79 there are a plurality of switching elements 81a–81e, such as five reed switches, opposed to magnet 78 and aligned in the swinging direction of arm 77 with given angular spacing. On the upper panel of housing 80, there are arranged display elements 82a–82e, such as light emitting diodes or liquid crystal display devices corresponding in number to the number of switching elements 81a–81e proximate the display elements 82a–82e are indicia 83 for indicating the line tensile force developed. Reference numeral 84 indicates a power switch.

Figure 13:
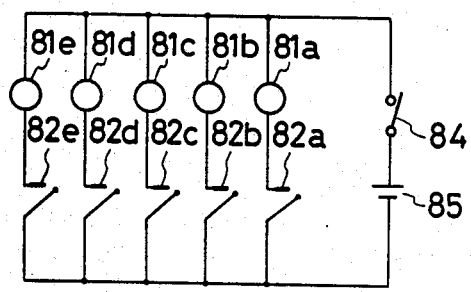
FIG. 13 is a circuit diagram of the display unit shown in FIG. 9.

FIG. 13 is a circuit diagram showing the interconnection of switching elements 81a–81e with respective display elements 82a–82e, for being provided with power from a battery 85 through a power switch 84.

Figure 9:
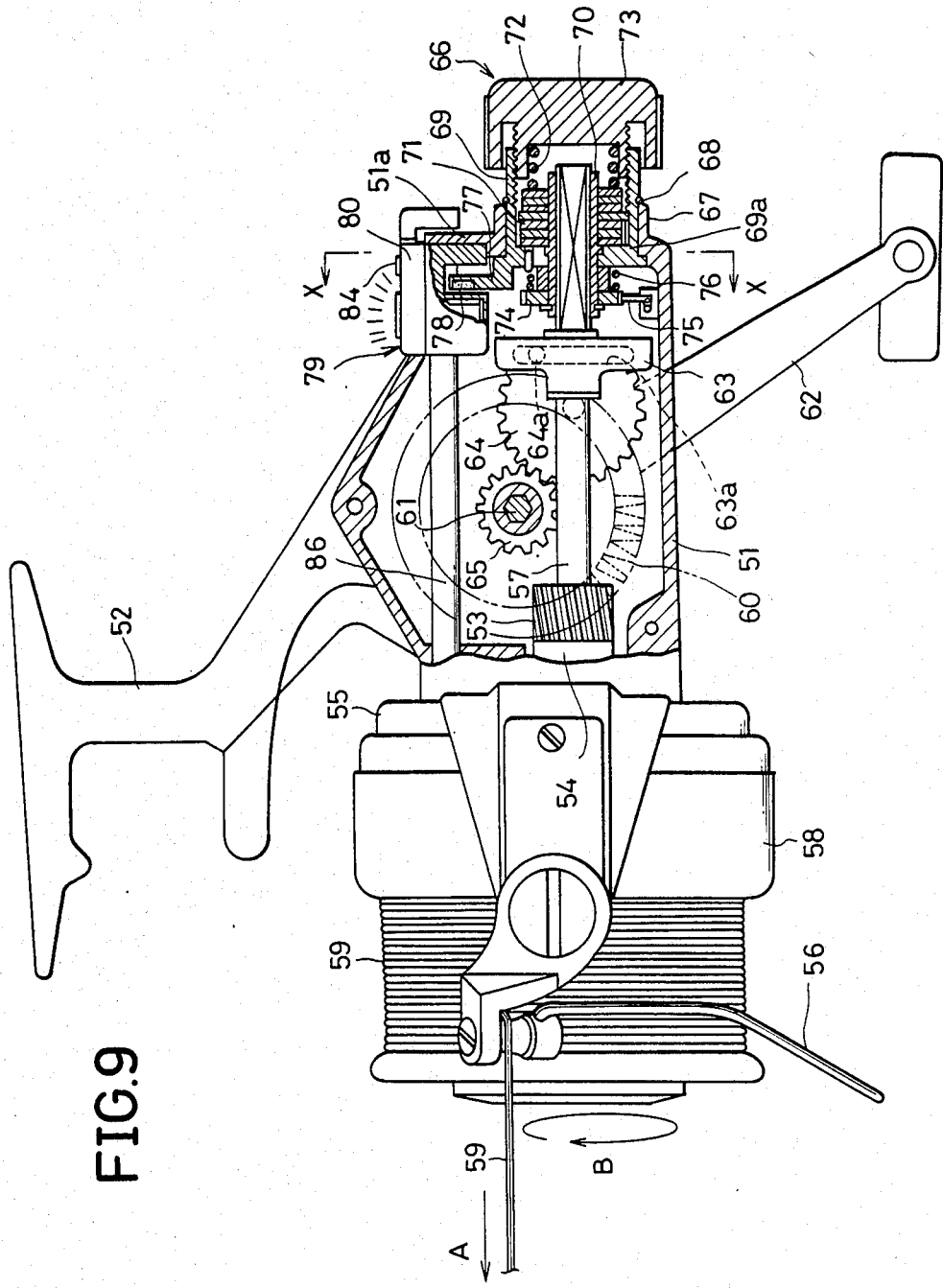
FIG. 9 is a longitudinal sectional side view showing third embodiment of the spinning reel equipped with the line tension display device according to the present invention.

In FIG. 9, reference numeral 86 indicates a check lever provided on reel body 1 for blocking reversal of flyer and releasing same.

Operation of such embodiment is as follows:

In fishing, knob 73 of drag unit 66 is first set to the desired drag force depending upon the thickness of the line used and object fish. Then, power switch 84 of display unit 79 is switched on to set display unit 79 in its tension display-enable state. In this state, as the fish takes the casted bait or lure, line 59 receives a tensile force in the direction of arrow A shown in FIG. 9 with rotation of flyer 55 being resisted in the direction of paying out line by a ratchet gear (not shown). Rotation of spool 58 in the direction of paying out line is restricted by drag force developed by drag unit 66 and torsion spring 76. Consequently, a torque is developed on spool 58 in the direction of arrow B shown in FIG. 9. In response to this torque, torsion spring 76 is deformed torsionally. Depending upon the resultant extent of torsional deformation, arm 77 together with spool shaft 57 and cylindrical body 69 will swing in the direction of arrow D shown in FIG. 10, so that magnet 78 comes to a position opposite to one of switching elements 81a–81e, or else to a position somewhere between adjacent switching elements. As a result, the switching element opposite to or nearest magnet 78 (for example, switching element 81c) is switched on, turning on the corresponding display element (such as 82c). Accordingly, reading the indicia proximate the lighted display element (such as 82c) slows the instantaneous tensile force acting on fishing line 59 at that moment.

While the angler is turning handle 62 in the direction for winding line 59 while fighting the fish caught, and if the magnitude of tension acting on the fishing line is not so strong as to result in the drag slipping state, the rotation of handle 62 is transmitted through drive gear 60, pinion 53 and flyer shaft 54 to flyer 55 so that flyer 55 and bail 56 rotate to wind the fishing line 59 on spool 58. A the same time, rotation of drive shaft 61 caused by handle operation is transmitted through gear 65 to the oscillation drive gear 64. As a result, spool 58 reciprocates axially with spool shaft 57 for winding line 59 evenly on spool 58.

On the other hand, if fishing line is tightened too greatly because of abrupt pulling or movement of the fighting fish, so that its tensile force becomes larger than the drag force which will cause drag slippage to occur, spool 58 turns in the direction of paying out line, thereby preventing line breakage. The line tensile force at this moment causes the switching element opposite to or nearest magnet 78 to switch on, whereby the display element connected to the above switching element turns on to indicates such condition.

Accordingly, by observation of the display provided by display section 79, the actual line tension when pulling against the fish can be perceived making it as possible to judge directly through visual observation whether or not the drag force set in the drag unit is suited to the fishing line being used. Further, the state of illumination of display elements 82a–82e makes it possible to set the drag force to a level suited to the thickness of the line and object fish, so that setting of the drag within the permitted limit of tension for the line is made easy. Although in this embodiment, the display is shown as giving five gradations, as in Kg, use of gradations by according line size, such as No. 1, No. 2, . . . No. 5, permits the tension limit for a specific fishing line to be perceived visually so that such mode of display provides warning of imminent line breakage.

In addition, by the assembly of sleeve 70, drag unit 66, torsion spring 76, and so forth within cylindrical body 69 so as to form a single unit, there is provided a unitized configuration, with attachment or mounting of these elements to the reel body 51 being simplified.

Figure 14:
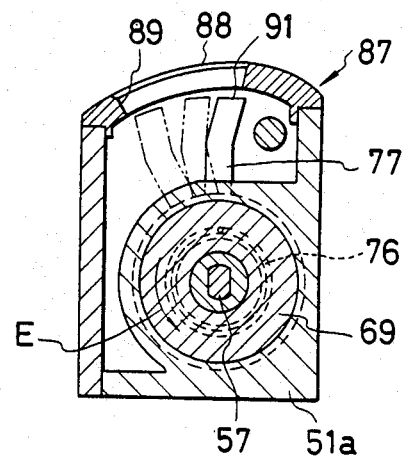
FIG. 14 is a sectional view similar to that of FIG. 10 which shows a fourth embodiment of a device of the present invention.
Figure 15:
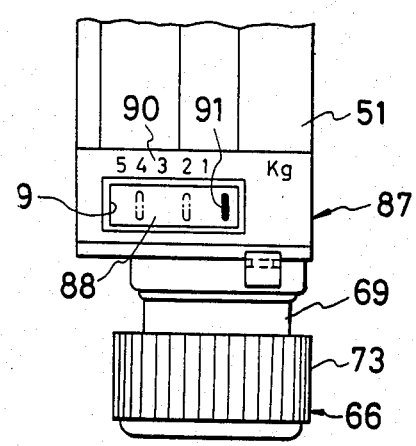
FIG. 15 is a plan view of the display unit section of FIG. 14.

FIGS. 14 and 15 show a fourth embodiment of the line tension display means according to the present invention.

Figure 10:
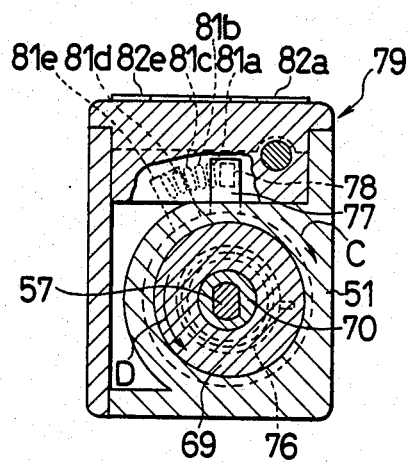
FIG. 10 is a sectional view taken along line X—X of FIG. 9.
Figure 11:
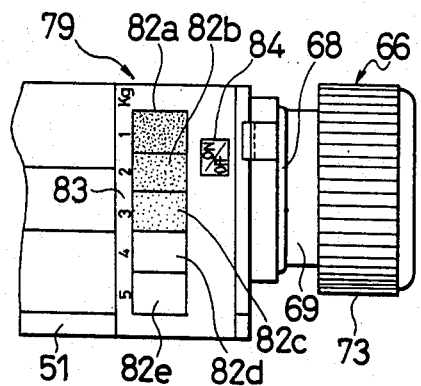
FIG. 11 is a plan view of the display unit section of the above.
Figure 12:
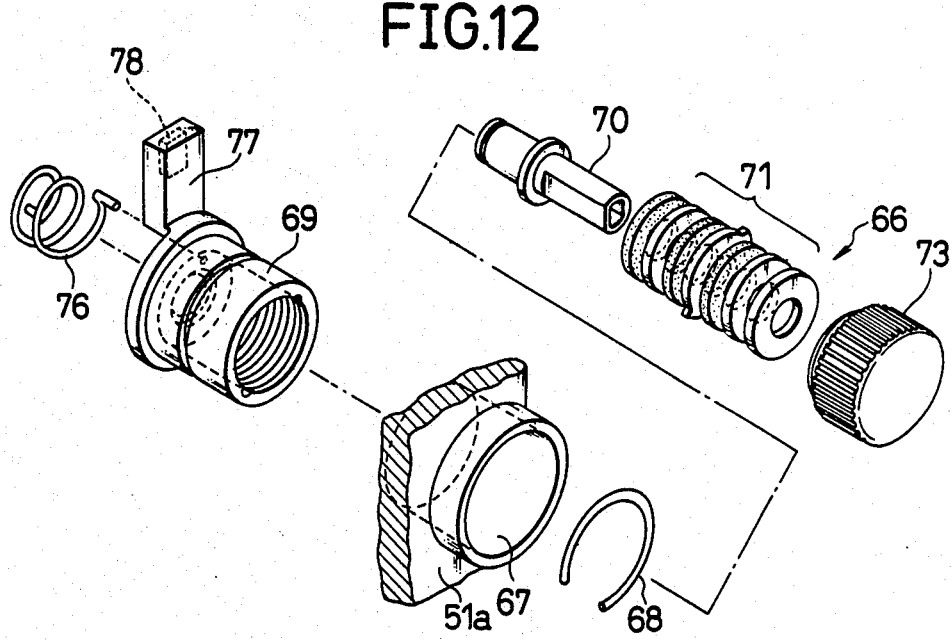
FIG. 12 is an exploded perspective view of a drag unit and cylindrical body section shown in FIG. 9.

In FIGS. 14 and 15, description of elements identical to those of FIGS. 10 and 11 is omitted, with differing elements being thereby emphasized.

In this embodiment, a display unit 87 is mounted on reel body 51 opposite from the swinging point of arm 77. Display unit 87 has a display window 89 covered by a transparent cover 88, with there being at the peripheral margin of this display window 89 a tension indicating scale 90 extending in the direction of swinging of arm 77. An index mark 91 is formed on the swinging point surface of arm 77.

In this embodiment, as arm 77 swings in the direction of arrow E, a graduation of scale 90 indicated by index 91 represents the line tensile force. Accordingly, this embodiment does not utilize switching elements, display elements, magnet, and so forth, whereby the display means is simplified and low-priced.

As described hereinabove, according to the present invention, the cylindrical body concentric to the spool shaft is attached rotatably to the rear wall of the reel body; and the drag unit for applying drag force through the spool shaft to the spool is assembled within this cylindrical body. The spring member is provided in the cylindrical body to restrict rotation, in the direction of paying out line, of the whole assembly inclusive of the spool, spool shaft, and drag unit. The amount of swinging of the radial arm swingable together with the spool shaft due to the torque generated by tensile force acting on the line when fighting a fish is indicated by the display unit and with such radial arm effectively magnifying such swing movement for display purposes. Thus, the tensile force so acting on the line can be directly perceived visually, and with setting of the drag force within the permitted limit of tension of the fishing line used being thus performed easily on the basis of the display provided.

FIGS. 16 through 20 show an embodiment in which a multi-function display device according to the present invention is applied to a spinning reel of the rear drag type. Reference numeral 101 indicates a reel body provided with a mounting leg 102 for the spinning rod, and in the front section of reel body 101 a flyer 105 is mounted rotatably by means of a hollow flyer shaft 104 having a pinion 103. A bail 106 is attached to flyer 105. A spool shaft 107 passes through the bore of flyer shaft 104 and is journalled therein and supported by flyer shaft 104. A spool 108 is secured integrally to the front end section of the spool shaft 107, with fishing line 109 being wound upon the spool.

A drive gear 110 is arranged inside reel body 101 in mesh with pinion 103. Drive gear 110 is attached to a drive shaft 111 supported rotatably by reel body 101 and extending in the direction orthogonal to spool shaft 107. To the projecting outer end of drive shaft 111, a handle 112 is attached for winding the line. A yoke or oscillation drive member 113 is secured to the projecting end of spool shaft 107 within reel body 101. Member 113 has a guide groove 113a extending vertically therein for receiving a pin 114a provided on 114 for oscillation of member 113. Oscillation drive gear 114 is supported rotatably within the reel body 101 in mesh with a gear 115 attached integrally to drive shaft 111. Accordingly, as handle 112 is operated and turned in the direction of winding the line, flyer 105 rotates and gear 114 is driven by gear 115. Thus, crank action of pin 114a relative to member 113 causes spool shaft 107 and spool 108 to reciprocate axially for winding the fishing line 109 evenly upon the spool.

A rear type drag unit 116 adjusts the magnitude of the drag force at which the line is payed out. Drag unit 116 includes a cylindrical body 119 fitted rotatably within a cylindrical opening 117 concentric with spool shaft 107, and is retained therein by a snap ring 118. A sleeve 120 passes through an end or bottom wall of body 119 and is supported thereby. Sleeve 120 is fitted on spool shaft 107 for permitting relative axial movement but rotatable with shaft 107, but as by means of splined rotation. Drag unit 116 comprises a group 121 of laminated washers positioned between sleeve 120 and body 119 for applying drag force through spool shaft 107 to sleeve 120. A spring 122 urges this laminated washer group 121 into compressed relationship to generate the drag force. A knob 123 is screwed to the opening section of body 119 for adjustment of the drag force.

A ratchet wheel 124 for generating clicks is secured to the projecting end of sleeve 120 within reel body 101, there being a resilient pawl segment 125 attached to the inside of the reel body 101 for engagement of ratchet wheel 124. A torsion spring 124 positioned concentrically around the periphery of sleeve 120 between ratchet wheel 124 and body bottom wall 119a has one end coupled to body 119 and its other end coupled to reel body 101. Thus, the whole assembly comprising spool shaft 107 and spool 108 is urged in the direction of arrow C shown in FIG. 17 and with rotation of spool 108 in the direction of paying out the line being thereby restricted. Within the reel body an arm 127 extends radially from body 119 to limit rotation thereof in the direction of arrow C and to magnify the amount of swinging of spool shaft 107 in the direction of arrow D. In a side surface of arm 127 near its outer end a magnet 128 is embedded.

A multi-function display unit 129 is positioned above arm 127 and mounted ot reel body 101. Within a housing 130 of display unit 129 are provided switching elements 131a–131e, such as five reed switches, which are opposite to magnet 128 and aligned in the swinging direction of arm 127 with given angular spacing. On the surface panel of housing 130, there are arranged a plurality of display elements 132a–132e, such as light emitting diodes or liquid crystal display devices for displaying the line tensile force at plural gradations (for example, five grades) in the form of a bar code. A digital display section 133 is provided on the surface panel of housing 130 and in the vicinity of display elements 132a–132e, which display section 133 is designed so as to present respective displays corresponding to a time-of-day (time) mode T, an alarm mode A, a stopwatch mode S, a line-breakage-warning setting mode L, and a line tension display mode. Reference numeral 134 indicates a mode change switch provided on the surface panel, 135 indicates an adjust switch, 136 indicates a set switch, and 137 indicates an alarm buzzer.

Figure 20:
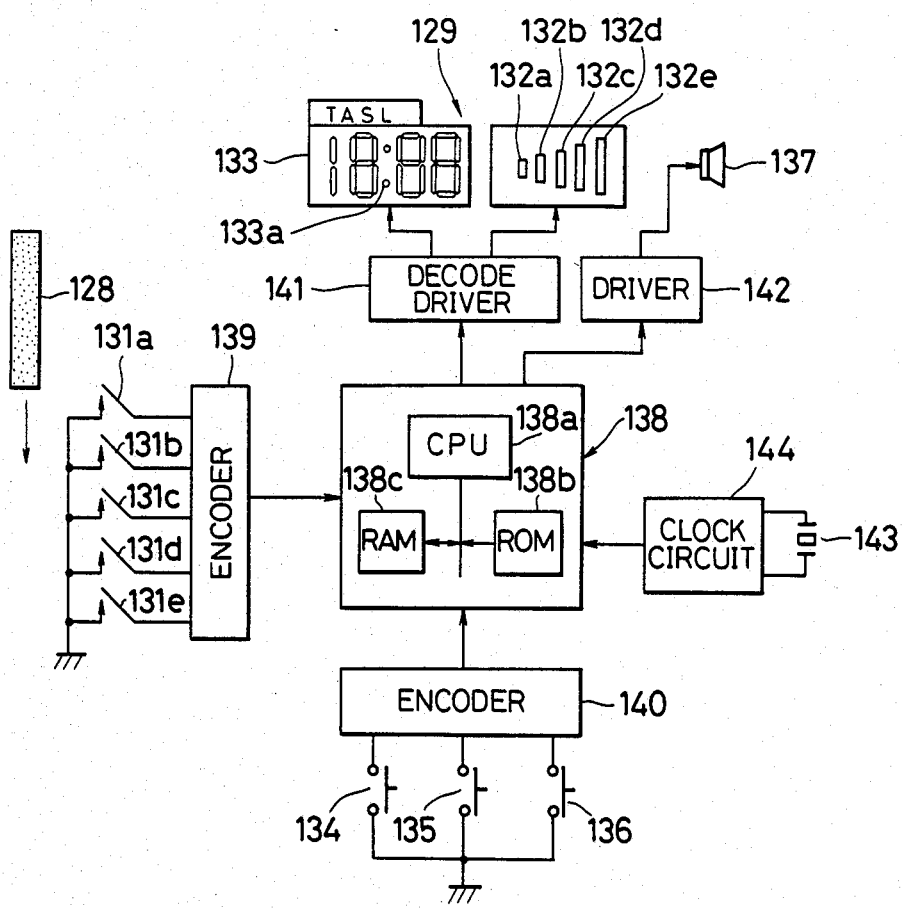
FIG. 20 is a block diagram showing a system configuration of the multi-function display device according to the present invention.

FIG. 20 shows the system configuration of the multi-function display section according to the present invention. Reference numeral 138 indicates an arithmetic/control unit, comprising a central processing unit (CPU) 138a, i.e., microprocessor, for controlling a program memory; data memory; input/output units; etc. and for processing tasks. A ROM-structured program memory 138b stores fixed data and programs used in response to each switch-oriented input to cause CPU 138a to execute a certain task; while a RAM-structured data memory 138c stores temporarily results of processes performed in CPU 138a and so forth. To the arithmetic/control unit 138 are applied switch signals of switching elements 131a–131e through an encoder 139, and switch signals of mode change switch 134, adjust switch 35 and set switch 136 through an encoder 140. With arithmetic/control unit 138 are interconnected a decode driver 141 of display section 129 and a driver 142 of buzzer 137, and the display signal decoded by decode driver 141 is supplied to line tension display elements 132a–132e and to digital display section 133. Reference numeral 143 indicates a crystal referenced oscillator, the frequency of which is converted by a clock circuit 144 to clock signals for representing hours, minutes, seconds, etc. which are signals applied to arithmetic/control 138.

Operation of the embodiment thus described is as follows:

When a power switch (not shown) is switched on, arithmetic/control unit 138 and peripheral circuits connected to the former are initialized. In this state, as mode change switch 134 is pushed intermittently or successively, and in response to the switch signal supplied through encoder 140, arithmetic/control unit 138 is switched in the order into the time mode T indicated by step S1, alarm mode A indicated by step S2, stopwatch mode S indicated by step S3, line-breakage-warning setting mode L indicated by step S4, and line tension display mode indicated by step S5 in FIG. 21. In response to each change of mode, "T", "A", "S", or "L" is turned on, except that no display is given when in the line tension display mode.

When the time mode is selected, the hour, minute and second data of the clock circuit 144 are read into data memory 138c of arithmetic/control unit 138 one time per each processing cycle thereof. The hour and minute data are output through decode driver 141 to digital display section 133 which displays digitally the momentarily-varying hour and minute data. The second data are also output through decode driver 141 to display section 133, whereby the colon display 133a is turned on and off at one-second intervals.

If it is desired to set the timepiece, the program shown in FIG. 22 is executed.

Specifically, when the time mode is selected by mode change switch 134 as shown at step S10, determination is made whether adjust switch 135 is pushed or not following step S11. If determination result is YES, after step S12 it is determined whether mode change switch 134 is pushed or not and, if so being pushed, the program proceeds to step S13 and the HOUR correction process is executed. On the other hand, if the determination at step S12 is NO, i.e., if switch 134 is not pushed, the program proceeds to step S14 and the MINUTE correction process is executed. As the HOUR and/or MINUTE setting ends, adjust switch 135 is pushed again (step S15). Thereby, the HOUR and MINUTE correction process is completed.

If the alarm mode is selected, and if set switch 136 is pushed, the alarm function is set; as a result, an actuating command is applied from arithmetic/control unit 138 to driver 142 at an alarm setting interval, whereby buzzer 137 sounds. Through sounding of buzzer 137 the angler is informed of the timing, for example, at which the tackle is to be moved up and down or bait is to be exchanged, whereby the fishing catch will be increased.

Figure 23:
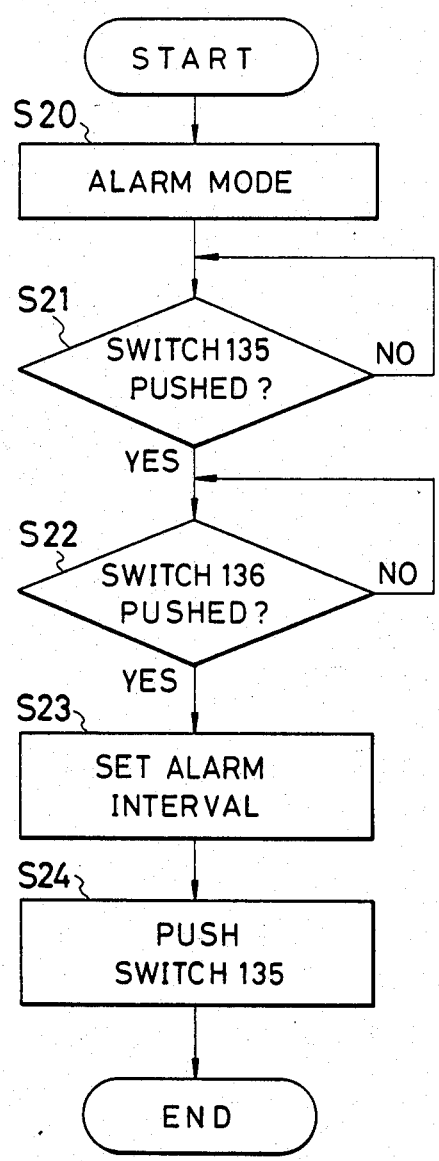

In this regard if, in the case of setting the alarm interval, after the alarm mode is selected at step S20 in FIG. 23, at step S21 it is determined whether adjust switch 135 is pushed or not. If the determination is YES, at step S22 it determined whether set switch 136 is pushed or not and if being pushed, the process of setting the alarm interval is executed at step S23. Thus set, the alarm interval is displayed digitally by digital display section 133. Then, if adjust switch 135 is pushed again (step S24), setting of the alarm interval is completed.

Figure 24:
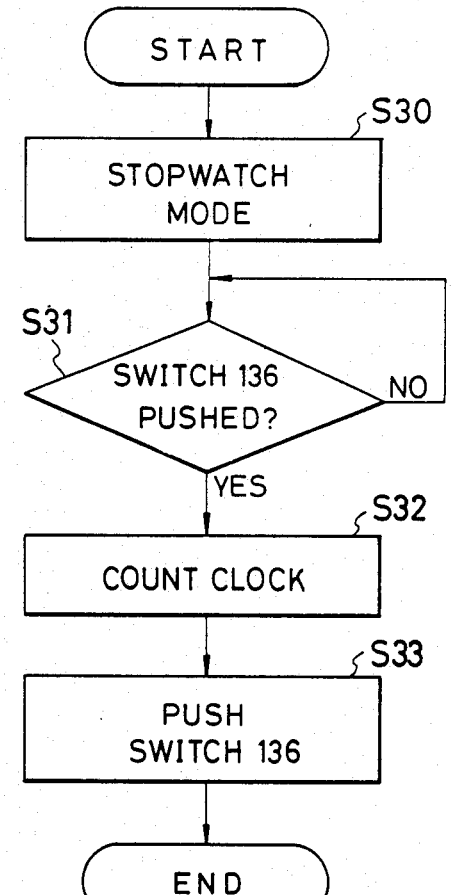

As for stopwatch operation, after the stopwatch mode is selected by mode change switch 134 as shown at step S30 in FIG. 24, at step S31 it is determined whether set switch 36 is pushed or not. If it is determined as being pushed, at step S32 stopwatch counting is started. The clock count is output from arithmetic/control unit 138 through decode driver 141 to display section 133, whereby the momentarily-varying clock count is displayed digitally by display section 33.

Accordingly, by starting the stopwatch when the lure is casted to a desired point and lands on the water and by reading the clock count displayed, the angler can determine the depth of lure sinking (by stopwatch count during the descent) and so judge a swimming layer of fish as by ledge or bottom location. In addition, in the course of pulling up the lure from a sunken location by giving periodic movement to the lure, it is possible to get a good bite by regulating the winding speed optimally so as to accord with a change inclock count of the stopwatch.

To stop the stopwatch function, set switch 136 is pushed again as shown at step S33 in FIG. 24. By this operation arithmetic/control unit 138 stops its counting action. To reset the count sown by display section 133, mode change switch 134 is pushed.

Figure 25:
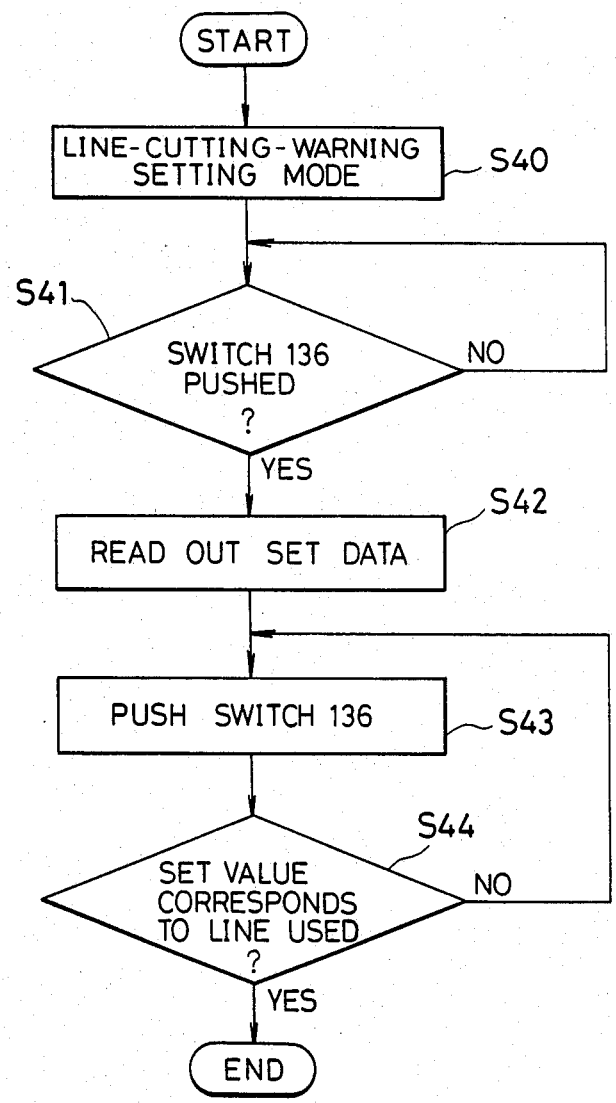

With reference to FIG. 25, the process and operation of the line-breakage-warning is as follows:

After the line-breakage-warning setting mode is selected by operation of mode change switch 134 at step S40 (FIG. 25), at step S41 it is determined whether the set switch 136 is pushed or not. If determined that the set switch 136 is pushed, at step S42 the current set value is displayed on display section 133. For example, "0" is displayed if the data of the line used are not set in data memory 138c; or the number "3" is displayed on display section 133 if the data of No. 3-line are set in data memory 138c.

Specifically, if the line currently used in No. 4, the set switch 136 is pushed again at step S43 to increase the set value of data memory 138c by one and the new set value is checked at step S44 as to whether or not that value corresponds to the line used. If the answer is NO, returning to step S43 set switch 136 is pushed again until the number displayed on display section 133 becomes identical to the number of the line currently used. Through the foregoing operation, the data displayed and set data are increased by one each time set switch 136 is pushed. If the display becomes "5", the preceeding display becomes "0" and the indication is advanced from "1" to "5" incrementally.

The line tension display mode, i.e., the operation during fishing, is as follows:

Knob 123 of drag unit 116 is first operated and set so that the drag corresponds to the thickness of the line (for example, No. 3-line) used, and to the intended, object fish. Mode change switch 134 is operated to set the display unit to the stopwatch mode; while the display unit is in this mode, the rod is casted toward a desired point. When the tackle lands in the water, paying out of line 109 is stopped and set switch 136 is pushed to start the stopwatch. Reading the depth of sinking of the tackle on the basis of the time indication of the stopwatch, counting-down is terminated when the tackle reaches bottom, enabling the angler to estimate the swimming level of fish. Then, by operating handle 112 for winding line 109 on spool 108 so as to impart the desired movement to the tackle, the angler awaits biting as the tackle rises from its sunken location. It is possible for the angler to regulate the winding speed of line 109 on the basis of observed change of the stopwatch count.

Figure 26:
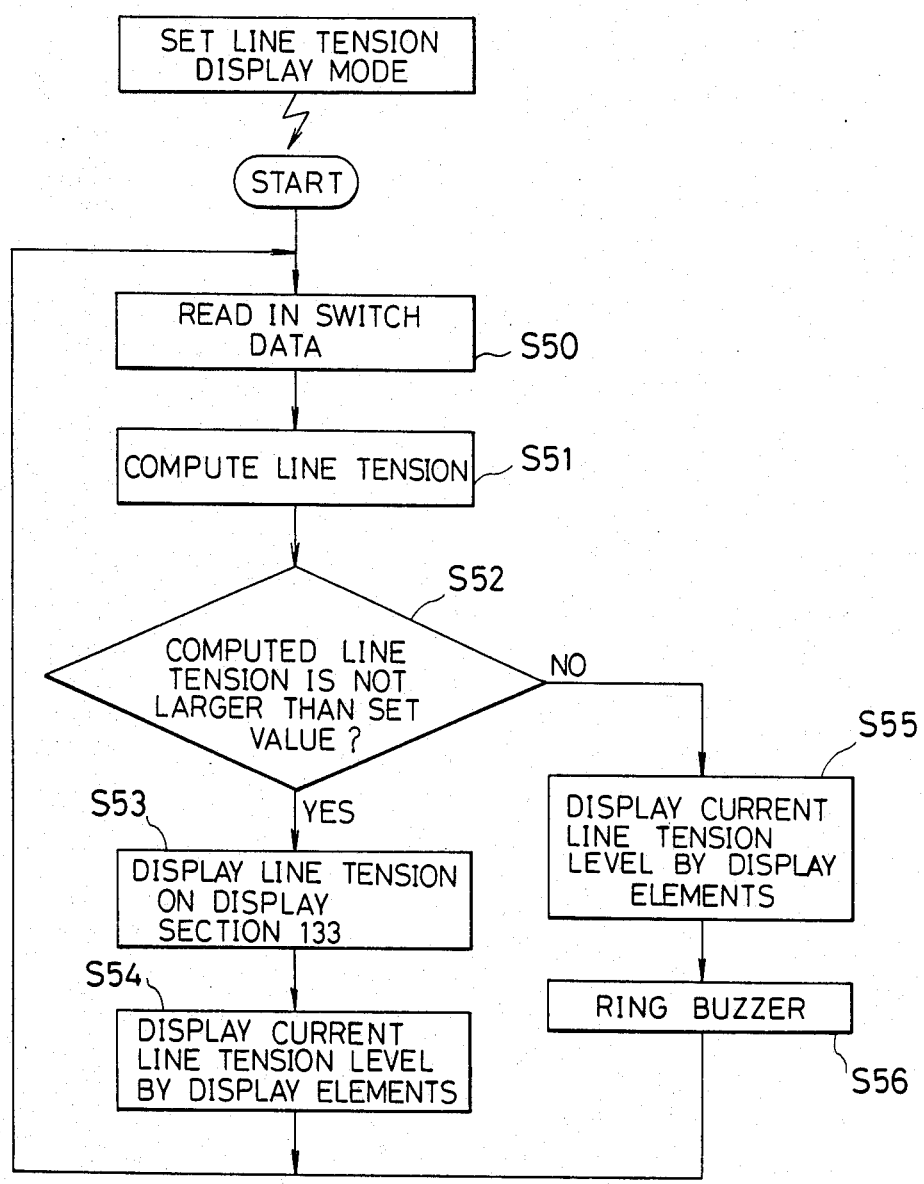

If, while the line is being wound, it is confirmed that a fish has been caught on the tackle, mode change switch 134 is pushed quickly to change the display device to its line tension display mode, so that the program shown in FIG. 26 is started.

Figure 16:
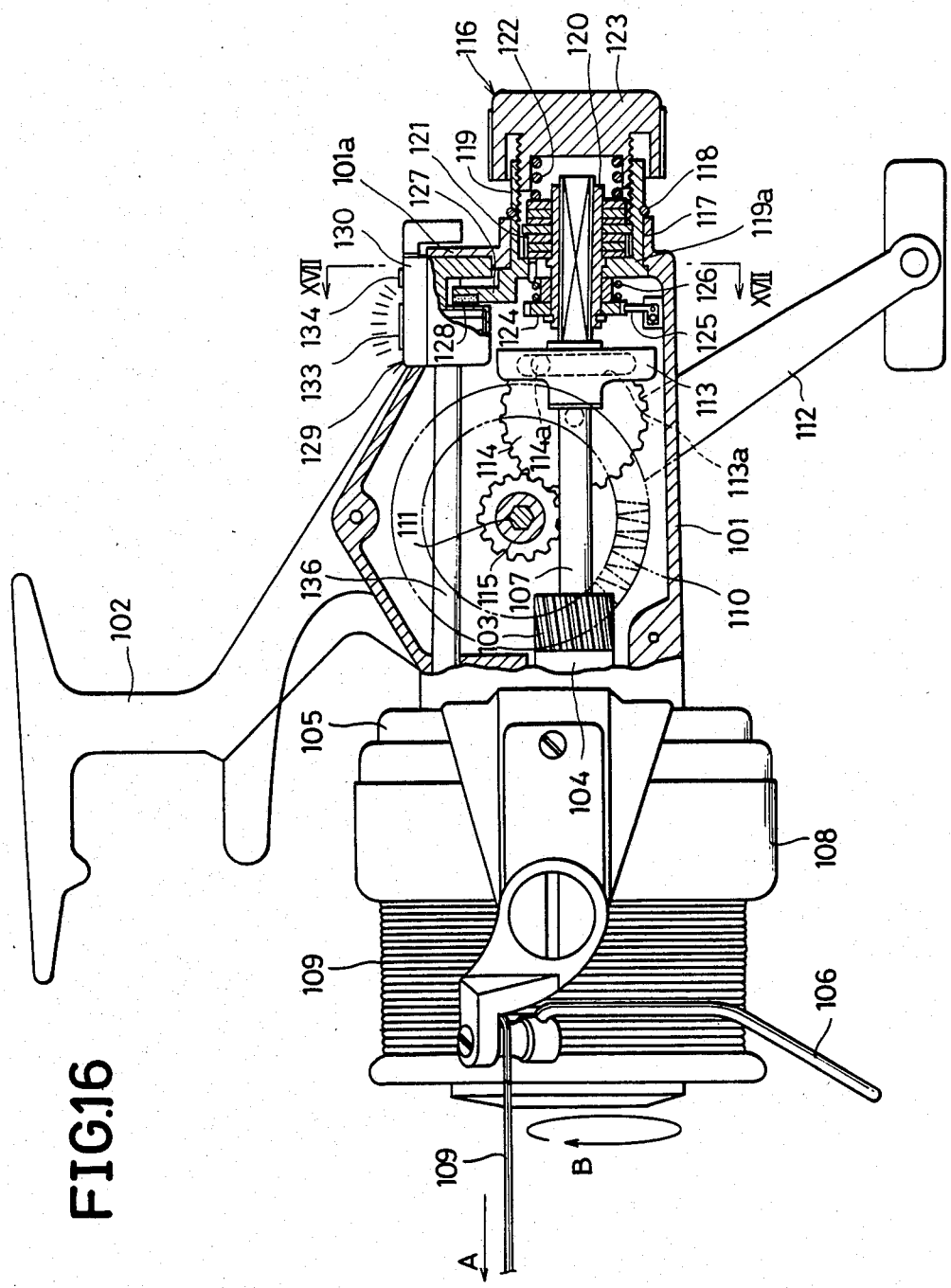
FIG. 16 is a longitudinal sectional side view showing a fifth embodiment of a spinning reel equipped with a multi-function display device according to the present invention.
Figure 17:
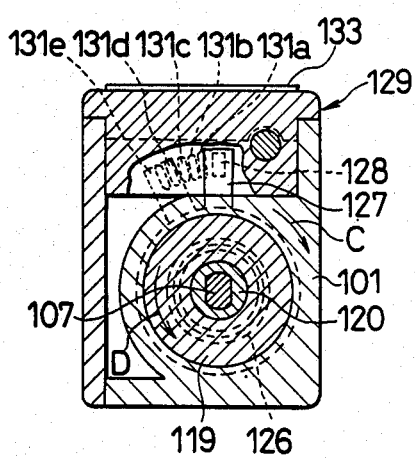
FIG. 17 is a sectional view taken along line XVII—XVII of FIG. 16.
Figure 18:
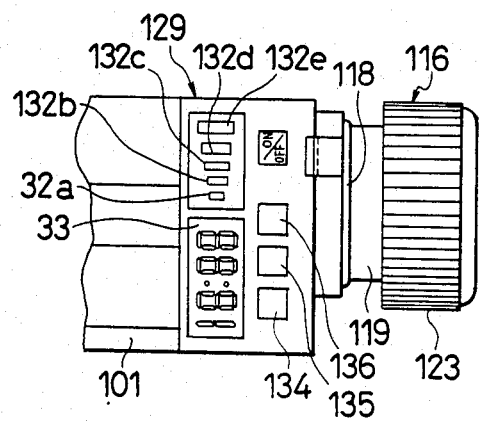
FIG. 18 is a plan view of the display unit section of the embodiment of FIG. 16.
Figure 19:
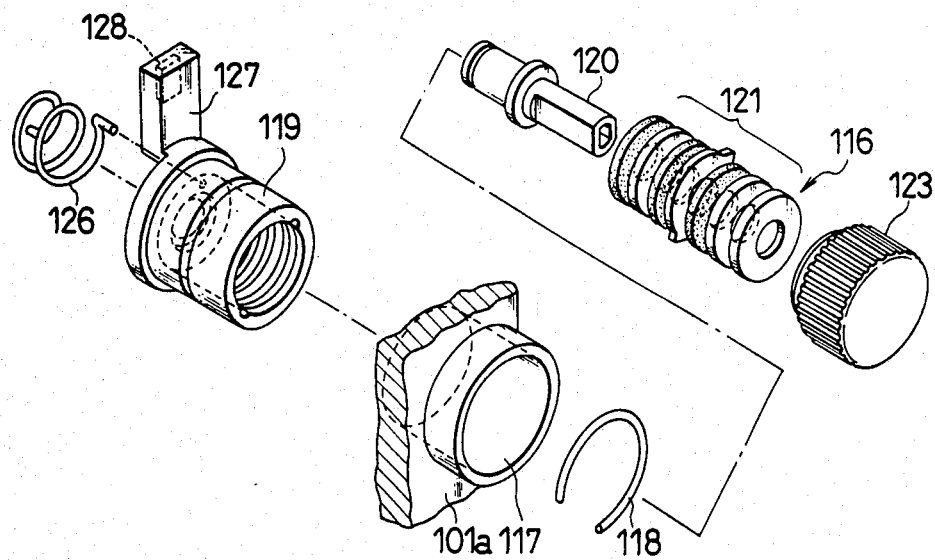
FIG. 19 is an exploded perspective view of the drag unit and cylindrical body section shown in FIG. 16.

When the line 109 receives tensile force in the direction of arrow A shown in FIG. 16 due to fighting of the fish caught on the tackle, rotation of the flyer 105 in the direction of paying out line is restricted by the ratchet wheel (not here shown); moreover, the rotation of spool 108 in the direction of paying out the line is restricted by the drag force developed by drag unit 116 and torsion spring 126. Thus, a torque is generated on spool 108 which tends thereby to be rotated in the direction of arrow B shown in FIG. 16. In response to this torque torsion spring 126 deforms torsionally. Depending upon the amount of torsional deformation, arm 127, together with spool shaft 107 and cylindrical body 119, swings in the direction of arrow D shown in FIG. 17. Magnet 128 provided on the swinging point of arm 127 moves to a position proximate one of the switching elements 131a-131e, thereby switching on the corresponding switching element.

As the program shown in FIG. 26 starts, at step S50 arithmetic/control unit 138 executes the process of reading in the switch data representing the ON/OFF state of switching elements 131a-131e, and the switch data so read are stored temporarily in a given area of data memory 138c. The program proceeds to its next step S51 and the actual line tensile force acting on the fishing line is computed on the basis of the switch data read. Then, proceeding to step S52, it is determined whether or not the computed line tensile force is not larger than a set value for warning of line breakage which has previously determined in relation to the line used, according to the following procedure:

The set value for warning of line breakage is the maximum tensile strength F (kg or lb) for each line to be used, multiplied by a safety factor; and each set value corresponding to respective line used, such as lines ranging from No. 1-line to No. 5-line, is previously stored in program memory 138b (or data memory 138c). In case the line used is No. 3, for example, its maximum tensile strength is about 4.8 Kg; but by letting the safety factor be 50%, the set value becomes $4.8 \times 50\% = 2.4$ Kg. This set value is designated for the line-breakage-warning setting mode and on the basis thereof the decision process at step S52 is executed.

When the determination at step S52 indicates that it is not larger than the set value, at step S53 the tensile force acting on the line used is displayed digitally on display section 133, and at step S54 the current line tensile force or level is indicated by turning on one or more of display elements 132a-132e, depending upon the tensile force acting on the line.

If the tensile force acting on the line is not larger than 2 Kg, for example, display element 132a or 132a and 132b, will be turned on; but the tensile force is sufficiently small no display element will be turned on.

If, while handle 112 is operated in a direction for winding the line, while resisted by a fish caught on the tackle, the tensile force acting on the line is not so strong as to cause drag slippage, then rotation of handle 112 is transmitted through drive gear 110, pinion 103 and flyer shaft 104 to flyer 105, with flyer 105 and bail 106 being rotated to wind the line 109 on spool 108. At the same time, rotation of drive shaft 111 resulting from handle operation is transmitted through gear 115 to oscillation drive gear 114 for oscillation of follower member 113. Spool 108 is thereby reciprocated in the axial direction together with spool shaft 107 by movement of element 113, winding the line evenly on spool 108.

When the line is drawn strongly due to abrupt pulling or movement of the caught fish when fighting so that the line tension becomes larger than the drag force, drag slippage does not occur because of misadjustment of the drag strength, the tensile force acting on the line exceeds the drag force value.

In such a situation, the determination at step S52 indicates that the actual tensile force has become larger than the set value, e.g., 2.4 Kg; thus, the program proceeds to step S55, the current line tension level is displayed by turning on display elements 132a-132c, for example, and at step S56 a buzzer drive command is applied from arithmetic/control unit 138 to driver 142, whereby buzzer 137 sounds to inform the angler of line breakage warning. The angler having perceived such warning stops winding of the line or controls winding so that the reel is turned in the direction of paying out line, thereby moderating the tensile force acting acting on the line.

During fishing, the program comprised of steps S50 through S56 shown in FIG. 26 is executed repeatedly, as described above.

As described hereinabove, according to the present invention, it is seen that the reel body is provided with a multifunction tension display device which has a plurality of time-indicating functions, including a time-of-day (time) function, alarm function, stopwatch function, in addition to a line tension display function; as well as alternatively providing a line-breakage-warning function; thus, the line tensile force at the time of fighting a fish can be perceived directly with the possibility of line-breakage being reduced remarkably. Further, conditions conducing to an increased fish catch, such as time interval of moving up and down the tackle, or of exchanging of bait, time zones for getting a good bite, and location of ledges, bottom, etc., can be discerned easily by the use of the new multi-function display device, and the operability and visual perceptions provided by the device according to the present invention through display and warning functions for enabling angler judgment are very satisfactory.

In view of the foregoing, it will be seen that the several objects of the invention are achieved and other advantages are attained.

Although the foregoing includes a description of the best mode contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

What is claimed is:

1. In a spinning reel having a reel body and a spool at the front of the reel body for winding of fishing line, a handle extending from the reel body, a flyer, and means for causing rotation of the flyer in response to operation of the handle for winding fishing line about the spool, a spool shaft for mounting of the spool, the improvement comprising a line tension display unit carried by the body including a member swingable about the spool shaft and operatively connected to the spool shaft for swinging movement in response to the tension in the line, spring means for resisting such swing movement, the reel including a drag unit for coupling the spool to the spool shaft, including drag force setting means, the drag unit providing a drag force to permit drag-slippage rotation of the spool upon the line tension exceeding such drag force, and display means comprising a plurality of electronically powered display devices, operative in response to movement of the swinging member about the spool shaft, for displaying values of line tension.

2. In a spinning reel having a reel body and a spool at the front of the reel body for winding of fishing line, a handle extending from the reel body, a flyer, and means for causing rotation of the flyer in response to operation of the handle for winding fishing line about the spool, a spool shaft for mounting of the spool, the improvement comprising a line tension display unit carried by the body including a member swingable about the spool shaft and operatively connected to the spool shaft for swinging movement in response to the tension in the line, spring means for resisting such swing movement, and display means comprising a plurality of electronically powered display devices, operative in response to movement of the swinging member about the spool shaft, for displaying values of line tension.

3. In a spinning reel according to claim 2, the swingable member including a radial extension which extends radially from the spool shaft, the display means including a plurality of switching elements positioned for operation responsive to proximity of the radial extension, the electrically operable display devices being interconnected in electrical circuit relationship with receptive ones of the switching elements, and an electric power source for powering the display devices for display operation thereof in response to operation of the respective switching devices, thereby to provide display of line tension values.

4. In a spinning reel according to claim 3, the radial extension including a magnet, the switching elements comprising reed switches responsive to proximity of the magnet.

5. In a spinning reel according to claim 3, the display devices being light emitting diodes or liquid crystal display devices.

6. In a spinning reel according to claim 2, the display devices being provided by a first readout, the readout being controlled by a microprocessor, and means for sensing the position of the swingable member for providing input to the microprocessor for enabling the microprocessor to drive said readout.

7. In a spinning reel according to claim 6, the swingable member including a radial extension carrying a magnet, the position sensing means comprising a plurality of reed switches operative responsive to proximity of the magnet, and an encoder connected to the reed switches for providing data input to the microprocessor in response to operation of the reed switches.

8. In a spinning reel according to claim 6, the first readout comprising display elements for indicating tension values.

9. In a spinning reel according to claim 6, the improvement further comprising a second readout controlled by the microprocessor, for providing time-indicating display, and means for causing the microprocessor to selectively provide different time-indicating functions for display by the second readout.

10. In a spinning reel according to claim 9, the different time-indicating function comprising time-of-day function, stopwatch function and alarm function.

11. In a spinning reel according to claim 10, the microprocessor being adapted for providing alternatively a line-breakage-warning, and further comprising a buzzer for sounding a line-breakage-warning upon the line tension reaching a predetermined value depending upon line thickness, the microprocessor including a memory for storing the preselected value.

12. In a spinning reel according to claim 11, the line tension display unit including a housing, a drag setting control knob extending rearwardly from the housing for setting a drag force for the fishing line, the first and second readouts being located atop the housing proximate the drag setting control knob.

13. In a spinning reel according to claim 2, the swingable member including a portion which extends radially from spool shaft to provide a pointer end including an index, the display means comprising a scale of tension values for being indicated by the index, and a window for observation of the so-indicated tension values.

14. In a spinning reel according to claim 13, the reel including a drag unit for coupling the spool to spool shaft, including drag force setting means, the drag unit providing a drag force to permit drag-slipping rotation of the spool upon the line tension exceeding such drag force.

15. In a spinning reel having a reel body and a spool at the front of the reel body, a flyer, and means for causing rotation of the flyer in response to operation of the handle for winding fishing line about the spool, a spool shaft for mounting of the spool, including drag setting control means for setting a preselected drag force to permit drag slippage rotation of the spool upon the line tension exceeding the preselected drag force, the improvement comprising a multifunction display unit carried by the body including a member swingable about the spool shaft and operatively connected to the spool shaft for swinging movement in response to the tension in the line, spring means for resisting such swing movement, and digital display means, including a microprocessor, associated with the swingable member for displaying the value of tension in the line and for displaying also time-indicating functions.

16. In a spinning reel as set forth in claim 15, the digital display including a first display section for displaying line tension values and a second display section for displaying time-indicating functions.

17. In a spinning reel as set forth in claim 16, the time-indicating functions comprising time-of-day, stopwatch, and alarm functions.

18. In a spinning reel as set forth in claim 16, the digital display means including means for providing line-breakage-warning made with display by the second display section of line-tension values, and means for providing an audible line-breakage-warning signal upon the line tension reading a predetermined value depending upon line thickness stored in a memory device for the microprocessor.

19. In a spinning reel as set forth in claim 16, the first display section providing a bar code readout for displaying discrete line tension values, the second display section providing numeric readout for displaying time-indication numerals.

* * * * *